July 17, 1928.
T. LARRIGAN
1,677,242
FAUCET
Filed July 14, 1927
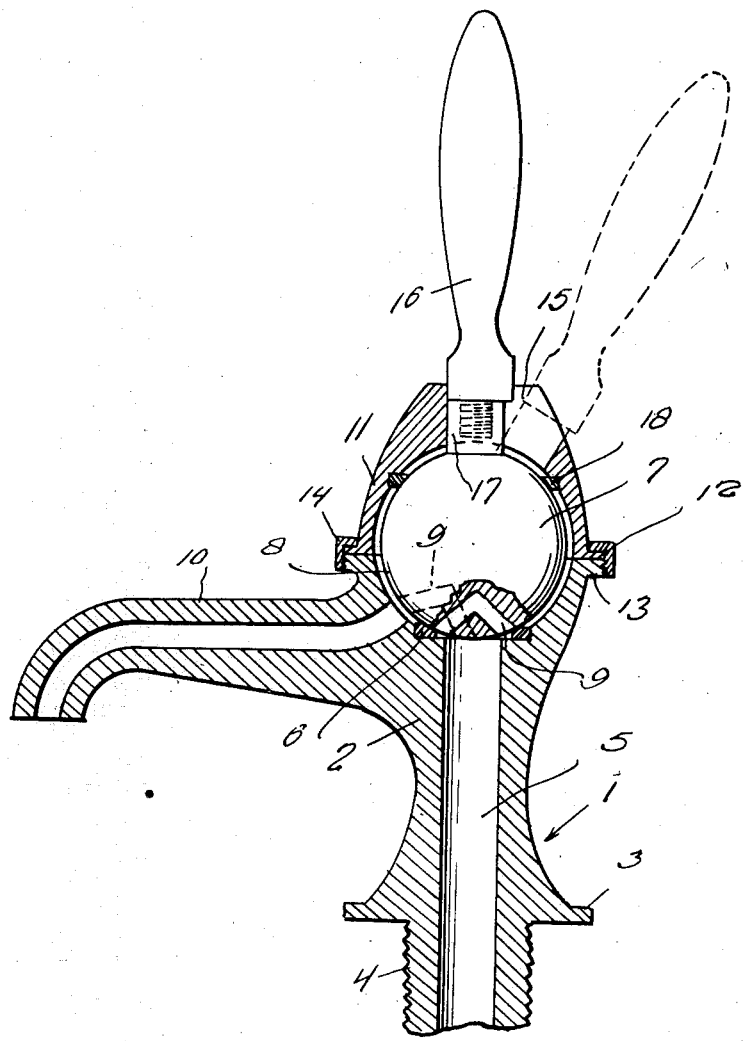
Inventor
Thomas Larrigan
By Clarence A O'Brien
Attorney Patented July 17, 1928.

1,677,242

UNITED STATES PATENT OFFICE.

THOMAS LARRIGAN, OF KANKAKEE, ILLINOIS, ASSIGNOR OF ONE-HALF TO ELZIE HUOT, OF KANKAKEE, ILLINOIS.

FAUCET.

Application filed July 14, 1927. Serial No. 205,618.

The present invention relates to an improved water faucet or spigot, which is characterized by an improved structural arrangement of parts, the principal feature of which is an improved oscillatory valve for controlling the passage of the fluid.

Briefly, the invention comprises a body of appropriate configuration provided with a passage, a valve seat, and a discharge nozzle. The body is constructed to accommodate a removable bonnet or cap, and a ball valve is located between the cap and the body, the same being provided with an operating handle and a passage for controlling the flow of fluid from the passage in the body to said nozzle.

My principal aim is to generally improve upon inventions of this class by providing one of comparative simplicity and durability, which is further individualized by an arrangement of details, such as are not likely to become out of order or to require frequent repair such as is ordinarily necessary with the customary form of water faucet.

Other features and advantages will become apparent from the following description and drawings.

In the drawings:—

The figure represents a vertical section through the body and cap, showing the ball valve and its operating handle in elevation and section.

Referring now to the drawings in detail, it will be seen that the body is generally designated by the reference character 1 and that is in the form of a casting including an upright portion 2 having a base flange 3 at its bottom, below which is a screw threaded attaching neck 4. This portion 2 is provided with an enlarged fluid passage 5 at the upper end of which is a counter-bore in which a packing ring 6 is located.

It will be noticed that the ring, together with a portion of the counter-bore provides a valve seat for a ball valve 7. In using a ball valve, it becomes necessary to construct the upper end of the upright with a semi-spherical recess 8 to accommodate the lower half of the ball. Incidentally, this portion of the ball is provided with a right angular bore 9, one branch of which is adapted to aline with the passage 5, and the other branch of which is adapted to aline with a complemental passage in the discharge spout or spigot 10, when the valve is in open position.

Cooperating with the upper half of the ball valve is a bonnet or cap 11 which is provided at its lower end with an outstanding marginal flange 12 resting upon a similar flange 13. The flange 13 is screw threaded and a ring nut 14 is connected therewith and cooperates with the flange 12 in clamping the cap in place. The upper end of the cap is formed with a guide slot 15 to accommodate the operating handle 16 for the valve.

It might be stated that the valve is provided with an extension 17 at its top and the extension is in turn provided with a screw threaded socket to receive the reduced shank on the handle. The handle is shaped to slide in the guide slot 15. Thus, in a broad sense, we have an oscillatory valve cooperating with the body and cap, and further cooperating with an additional packing ring 18 in the upper half of the cap.

When the handle 16 is in a truly vertical position as shown in full lines in the drawings, the valve passage 9 is closed. However, when rocking the handle from left to right to the dotted line position, the ball valve is moved so that the branches of the passage 9 aline with the passage 5 and with the passage in the discharge nozzle 10. The valve is then opened.

As before stated, it is thought that by considering the detailed description in connection with the drawings, a clear understanding of the construction and operation of the invention will be had. Consequently, a more lengthy description is thought unnecessary.

Minor changes in shape and size, as well as re-arrangement of parts, coming within the scope of the adjoined claims, may be resorted to if desired.

Having thus described my invention, what I claim as new is:—

1. In a domestic water faucet of the class described, a body in the form of a metal casting including an upright provided at its bottom with a screw threaded neck and a base flange, and provided at its top with a substantially semi-spherical recess, said upright further having a fluid passage communicating with the central portion of said recess, there being a counter-bore at the juncture of the said recess and passage, and said counter-bore forming a washer receiving depression, a renewable packing washer located in said depression, said upright being formed at its top with a screw threaded portion, and a laterally directed discharge nozzle having a passage in communication with said recess, said passage being at substantial right angles to the first named passage, a ball confining bonnet having an outstanding flange at its bottom, a clamping and retaining nut connected with said flanges, said bonnets further having a substantially semi-spherical recess cooperating with the first named recess and being provided with a guide slot, a ball valve located in said recesses and provided at its bottom with a substantially right angular fluid passage for cooperation with said first named passage and valve seat washer, and a handle connected to said ball valve and slidably mounted in said guide slot.

2. As a new product of manufacture, a domestic water faucet of the class described comprising a body including a flanged portion beyond which is an externally screw threaded attaching neck, further including a right angularly disposed discharge nozzle having a water passage, said body being provided with a bore forming a water intake passage and having an especially designed portion at the inner end of the nozzle which is externally screw threaded, formed with a substantially semi-circular recess and with a centrally located counter-bore providing a washer receiving depression, a renewable valve seat forming washer removably fitted in said depression, a ball valve having its lower portion disposed in said semi-spherical recess, said valve having a passage of right angular form whose branches may be caused to register with said passages, or may be disposed against and closed by said valve seat washer, a cap fitting over the projecting upper half portion of said ball valve, said cap being provided with an outstanding flange and with a slot in its top portion, a nut embracing the cap and body, said nut being connected with the aforesaid screw threaded portion and engaging said flange, whereby to hold the cap removably in place against the valve and to connect it to said body, and a handle extending in thru said slot and separably connected with said ball valve, whereby the valve may be opened and closed by rocking the handle back and forth in said slot.

In testimony whereof I affix my signature.

THOMAS LARRIGAN.